Figure 1:
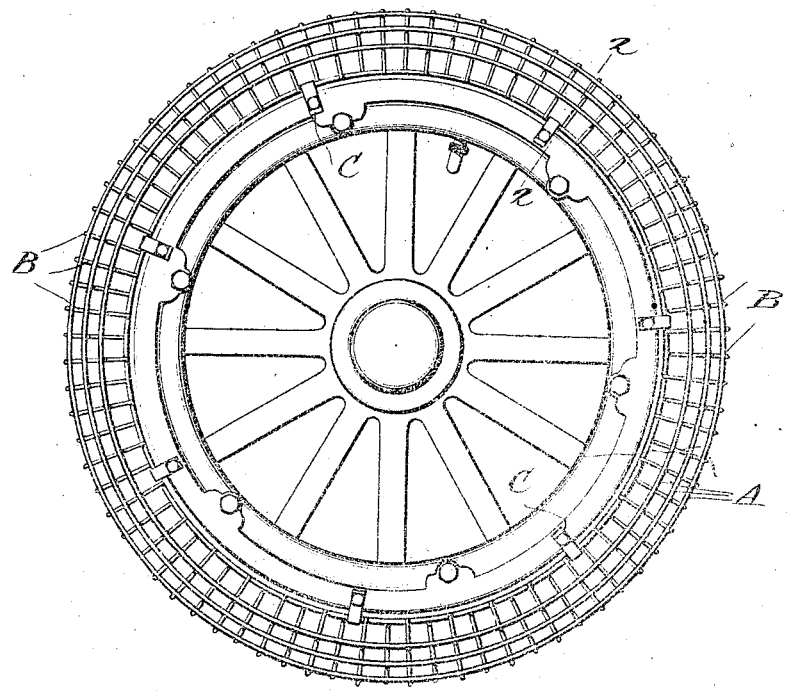

G. RIDDLE.
COVER FOR AUTOMOBILE TIRES.
APPLICATION FILED MAY 9, 1916.

1,212,558.   Patented Jan. 16, 1917.

UNITED STATES PATENT OFFICE.

GRANT RIDDLE, OF RIDDLE, IDAHO.

COVER FOR AUTOMOBILE-TIRES.

1,212,558.  Specification of Letters Patent.  Patented Jan. 16, 1917.

Application filed May 9, 1916. Serial No. 96,352.

*To all whom it may concern:*

Be it known that I, GRANT RIDDLE, a citizen of the United States, residing at Riddle, in the county of Owyhee and State of Idaho, have invented a new and useful Cover for Automobile-Tires, of which the following is a specification.

My invention relates to a cover for automobile tires as illustrated in the accompanying drawing.

The drawing shows the tire cover made of a network of steel cables.

Similar letters refer to similar parts.

Figure 2:
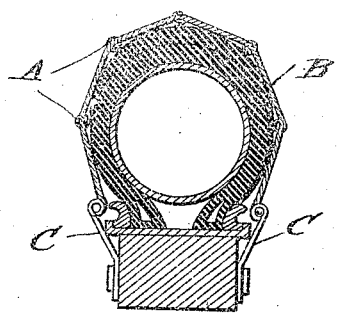

As disclosed in the accompanying drawings, Figure 1 is a view in elevation illustrating a cover or armor for an automobile tire constructed in accordance with an embodiment of my invention and in applied position; and Fig. 2 is a sectional view taken substantially on the line 2—2 of Fig. 1.

A represents the wire cables which extend circumferentially of the tire, and are 1½ inches apart, to be made of ⅜-inch steel cable or larger, according to the size of the tire.

B represents steel cables passing transversely through the steel cables A. They are ¼ inch in diameter or larger according to the size of the tire, and spaced 1 inch apart. All ends of cables, and at all points where the small cables B, intersect the larger ones A, are riveted or electrically welded together.

C are clamps to fasten the tire cover to the rim of the wheel.

This cover is to be made the exact size of the tire for which it is made, so that when the tire is inflated, the cover will become tight. Instead of depending on the strength of the tire alone, this cover strengthens the tire, prevents blow-outs and lessens the liability of punctures, and makes the tire absolutely non-skid.

With this cover to strengthen the tire, much lighter and less expensive tires can be used.

I claim:

A tire armor comprising a plurality of strands adapted to extend circumferentially of a wheel, and a plurality of transversely disposed strands threaded through the first named strands, the intersecting portions of the circumferential strands and the transverse strands being welded one to the other.

GRANT RIDDLE.

Witnesses:
JOHN R. TEAL,
CECILIA RIDDLE.